United States Patent
Kojima et al.

(10) Patent No.: US 11,090,807 B2
(45) Date of Patent: Aug. 17, 2021

(54) MOTION GENERATION METHOD, MOTION GENERATION DEVICE, SYSTEM, AND COMPUTER PROGRAM

(71) Applicant: OMRON Corporation, Kyoto (JP)

(72) Inventors: Takeshi Kojima, Kyoto (JP); Akane Nakashima, Nara (JP); Kennosuke Hayashi, Kizugawa (JP); Haruka Fujii, Uji (JP)

(73) Assignee: OMRON Corporation, Kyoto (JP)

( * ) Notice: Subject to any disclaimer, the term of this patent is extended or adjusted under 35 U.S.C. 154(b) by 293 days.

(21) Appl. No.: 16/012,886

(22) Filed: Jun. 20, 2018

(65) Prior Publication Data
US 2019/0015980 A1 Jan. 17, 2019

(30) Foreign Application Priority Data

Jul. 14, 2017 (JP) .............................. JP2017-137963

(51) Int. Cl.
*B25J 9/16* (2006.01)
(52) U.S. Cl.
CPC .......... *B25J 9/1666* (2013.01); *B25J 9/1605* (2013.01); *B25J 9/1664* (2013.01); *B25J 9/1671* (2013.01);
(Continued)
(58) Field of Classification Search
CPC ...... B25J 9/1605; B25J 9/1664; B25J 9/1666; B25J 9/1671; B25J 9/1697;
(Continued)

(56) References Cited

U.S. PATENT DOCUMENTS 6,604,005 B1 * 8/2003 Dorst .................... B25J 9/1666
700/56
9,682,476 B1 * 6/2017 Prats ..................... B25J 9/1664
(Continued)

FOREIGN PATENT DOCUMENTS

| CN | 103064743 A | 4/2013 |
| CN | 106625666 A | 5/2017 |

(Continued)

OTHER PUBLICATIONS

The extended European search report (EESR) dated Oct. 9, 2018 in a counterpart European patent application.
(Continued)

*Primary Examiner* — Robert T Nguyen
(74) *Attorney, Agent, or Firm* — Metrolex IP Law Group, PLLC

(57) ABSTRACT

A motion generation device may be for generating a movement for changing the robot from a first orientation to a second orientation, and include a first acquisition unit that acquires first orientation information that specifies the first orientation and second orientation information that specifies the second orientation, a second acquisition unit that acquires at least one priority item regarding the movement for changing from the first orientation to the second orientation, and a movement generation unit that generates a motion of the robot that includes a movement path along which the robot moves from the first orientation to the second orientation, based on the first orientation information, the second orientation information, and the priority item that were acquired.

19 Claims, 12 Drawing Sheets

(52) U.S. Cl.
CPC ... *B25J 9/1697* (2013.01); *G05B 2219/39217* (2013.01); *G05B 2219/39357* (2013.01); *G05B 2219/39358* (2013.01); *G05B 2219/39361* (2013.01); *G05B 2219/40073* (2013.01)

(58) Field of Classification Search
CPC .......... G05B 2219/39217; G05B 2219/39357; G05B 2219/39358; G05B 2219/39361; G05B 2219/40073
See application file for complete search history.

(56) References Cited

U.S. PATENT DOCUMENTS

| | | | | |
|---|---|---|---|---|
| 2007/0124024 | A1* | 5/2007 | Okamoto | B25J 5/007 700/245 |
| 2014/0081452 | A1 | 3/2014 | Ito et al. | |
| 2014/0277731 | A1 | 9/2014 | Kamiya et al. | |
| 2015/0012135 | A1 | 1/2015 | Wu | |
| 2015/0277398 | A1* | 10/2015 | Madvil | G05B 13/04 700/97 |
| 2017/0028559 | A1* | 2/2017 | Davidi | B25J 9/1682 |
| 2020/0055152 | A1* | 2/2020 | Chavan Dafle | B25J 9/1612 |

FOREIGN PATENT DOCUMENTS

| | | |
|---|---|---|
| EP | 0317020 A2 | 5/1989 |
| JP | 2012-61567 A | 3/2012 |
| JP | 2014-58004 A | 4/2014 |
| JP | 2014-180704 A | 9/2014 |
| JP | 5656189 B2 | 1/2015 |
| JP | 2015-37818 A | 2/2015 |

OTHER PUBLICATIONS

The Office Action (JPOA) dated Jan. 29, 2021 in a counterpart Japanese patent application.
Office Action (CNOA) dated April 29, 2021 in a counterpart Chinese patent application.

* cited by examiner

MOTION GENERATION METHOD, MOTION GENERATION DEVICE, SYSTEM, AND COMPUTER PROGRAM

CROSS-REFERENCES TO RELATED APPLICATIONS

This application claims priority to Japanese Patent Application No. 2017-137963 filed Jul. 14, 2017, the entire contents of which are incorporated herein by reference.

FIELD

The disclosure relates to a motion generation method, a motion generation device, a system, and a computer program for generating movements for a robot.

BACKGROUND

There is a conventionally known algorithm called path planning for automatically generating robot motions. In general, the path planning algorithm generates motions for achieving the shortest movement time.

JP 2014-180704A discloses a robot picking system in which the smaller a required time T for a gripper to reach a candidate workpiece WC is, the higher the score of an evaluation value Ev is set. In this robot picking system, candidate data is generated for multiple candidate workpieces WC that are picking object candidates, and an object workpiece WO that is to actually being picked is selected based on the candidate data and picked.

JP 2014-180704A is an example of background art.

However, it is not necessarily the case that motions that achieve the shortest movement time are always optimum motions. For example, if motions that achieve the shortest movement time are generated regardless of the fact that a workpiece is a "right side up" workpiece, problems may occur such as the overturning of the "right side up" workpiece due to not giving consideration to the orientation of the workpiece, and the detachment and scattering of a component not fixed to a gripped workpiece due to not giving consideration to the acceleration applied to the workpiece. Each time such a problem occurs, the user needs to manually teach optimum motions between control points and regenerate or modify the generated motions, which leads to a decrease in work efficiency.

SUMMARY

In view of this, one or more aspects may provide a motion generation method, a motion generation device, a system, and a computer program that can generate optimum motions for a robot in accordance with the operation content or the like.

A motion generation method according to an aspect is a motion generation method for generating a movement for changing a robot from a first orientation to a second orientation, the motion generation method including: acquiring first orientation information that specifies the first orientation and second orientation information that specifies the second orientation; acquiring at least one priority item regarding the movement for changing from the first orientation to the second orientation; and generating a motion of the robot that includes a movement path along which the robot moves from the first orientation to the second orientation, based on the first orientation information, the second orientation information, and the priority item that are acquired.

According to an aspect, motions for the robot are generated based on not only the information that specifies the first orientation and the second orientation, but also the at least one priority item regarding the movement from the first orientation to the second orientation, thus making it possible to generate appropriate motions that give consideration to the input priority item as well.

In an aspect, the motion generation method may further include: allowing selection of a type of operation content or an operation target of the robot; and determining the priority item based on the type of operation content or the operation target that is selected.

According to an aspect, a priority item can be generated by merely selecting operation content or an operation target, thus making it possible for even a user not proficient with the robot to generate appropriate motions.

In an aspect, the motion generation method may further include associating the type of operation content or the operation target with the priority item.

According to an aspect, the user or the like can associate operation content or an operation target with a priority item, and therefore by associating operation content or operation targets with priority items based on past records or the like, it is possible to generate appropriate motions, and also possible to shorten the time required to generate appropriate motions.

In an aspect, in the acquiring of the priority item, a plurality of the priority items associated with the movement and priorities of the plurality of priority items may be acquired, and in the generating of the motion, the motion may be generated based on the acquired priorities.

According to an aspect, more appropriate motions can be generated based on multiple priority items, thus making it possible to flexibly accommodate a diverse range of user needs.

In an aspect, the motion generation method may further include: acquiring surrounding environment information regarding the robot, wherein in the generating of the motion, the motion may be generated based on the acquired surrounding environment information.

According to an aspect, consideration is given to information regarding the surrounding environment, such as obstacles, and motions can be generated so as to automatically avoid obstacles, for example.

In an aspect, the surrounding environment information may be acquired using a sensor that acquires information regarding surroundings of the robot, be acquired using an input unit, or be acquired from electronic data that includes information regarding surroundings of the robot.

According to an aspect, the surrounding environment information can be easily acquired with use of measurement results or the like from the sensor.

In an aspect, the first orientation information may be acquired based on an orientation of the robot.

According to an aspect, the input of the first orientation information by the user or the like can be omitted or simplified, thus making it possible to alleviate the burden of input by the user or the like, and also possible to improve practical use.

In an aspect, the robot may be a robot arm that includes an extremity portion, and the first orientation information or the second orientation information may be acquired based on a position and an orientation of the extremity portion.

According to an aspect, orientation information can be acquired with use of a method such as Inverse Kinematics based on the position and the orientation of the extremity portion, thus making it possible to alleviate the burden of input by the user without impairing practical use.

In an aspect, the movement that is generated may be a movement for handling a workpiece, and the second orientation information may be acquired based on spatial position information regarding the workpiece.

According to an aspect, it is possible to alleviate the burden of input by the user without impairing practical use when performing a workpiece gripping operation such as picking.

In an aspect, the robot may be a simulator device for virtually testing a movement.

According to an aspect, motions can be generated without using the robot that is to be actually used in operation.

In an aspect, the priority item may be a constraint condition regarding the movement.

According to an aspect, it is possible to generate motions so as to always satisfy a predetermined condition regarding the item selected as the priority item.

In an aspect, the priority item may be at least one of a speed of the robot, an acceleration of the robot, and an orientation of a first target object that is to be handled by the robot.

According to an aspect, it is possible to generate a motion that gives consideration to the speed of the robot, the acceleration of the robot, and the orientation of the first target object that is to be handled.

In an aspect, the motion generation may further include selecting, based on the priority item, any one of a first algorithm that generates the motion such that a movement time of the robot when moving from the first orientation to the second orientation is in a predetermined range, a second algorithm that generates the motion such that an acceleration of the robot when moving from the first orientation to the second orientation is in a predetermined range, and a third algorithm that generates the motion such that an orientation of a second target object that is to be handled by the robot when moving from the first orientation to the second orientation is in a predetermined range.

According to an aspect, it is possible to generate motions for the robot based on an optimum algorithm selected from among the speed prioritization algorithm, the acceleration priority algorithm, and the orientation priority algorithm in accordance with the objective.

A motion generation device according to an aspect is a motion generation device for generating a movement for changing a robot from a first orientation to a second orientation. The motion generation device includes a first acquisition unit configured to acquire first orientation information that specifies the first orientation and second orientation information that specifies the second orientation, and a second acquisition unit configured to acquire at least one priority item regarding the movement for changing from the first orientation to the second orientation. The motion generation device also includes a movement generation unit configured to generate a motion of the robot that includes a movement path along which the robot moves from the first orientation to the second orientation, based on the first orientation information, the second orientation information, and the priority item that are acquired.

According to an aspect, motions for the robot are generated based on not only the information that specifies the first orientation and the second orientation, but also the at least one priority item regarding the movement from the first orientation to the second orientation, thus making it possible to generate appropriate motions that give consideration to the input priority item as well.

In an aspect, the motion generation device may further include: a selection unit configured to select of a type of operation content or an operation target of the robot; and a priority item determination unit configured to determine the priority item based on the type of operation content or the operation target that is selected.

According to an aspect, a priority item can be determined by merely selecting operation content or an operation target, thus making it possible for even a user not proficient with the robot to generate appropriate motions.

In an aspect, the motion generation device may further include a registration unit configured to associate the type of operation content or the operation target with the priority item.

According to an aspect, the user or the like can associate operation content or an operation target with a priority item, and therefore by associating operation content or operation targets with priority items based on past records or the like, it is possible to generate appropriate motions and also possible to shorten the time required to generate appropriate motions.

In an aspect, the second acquisition unit may be configured to acquire a plurality of the priority items associated with the movement and priorities of the plurality of priority items, and the movement generation unit may be configured to generate the motion based on the acquired priorities.

According to an aspect, more appropriate motions can be generated based on multiple priority items, thus making it possible to flexibly accommodate a diverse range of user needs.

In an aspect, the motion generation device may further include an environment acquisition unit configured to acquire surrounding environment information regarding the robot, wherein the movement generation unit may be configured to generate the motion based on the acquired surrounding environment information.

According to an aspect, consideration is given to information regarding the surrounding environment, such as obstacles, and motions can be generated so as to automatically avoid obstacles, for example.

A system according to an aspect includes: a robot and any of the above-described motion generation devices for generating a movement for changing the robot from a first orientation to a second orientation.

According to an aspect, motions for the robot are generated based on not only the information that specifies the first orientation and the second orientation, but also the at least one priority item regarding the movement from the first orientation to the second orientation, thus making it possible to provide the system that generates appropriate motions that give consideration to the input priority item as well, and includes a robot that appropriately operates based on the generated motions.

A computer program according to an aspect is a computer program for generating a movement for changing a robot from a first orientation to a second orientation, the computer program causing a computer to execute: acquiring first orientation information that specifies the first orientation and second orientation information that specifies the second orientation; acquiring at least one priority item regarding the movement for changing from the first orientation to the second orientation; and generating a motion of the robot that includes a movement path along which the robot moves from the first orientation to the second orientation, based on the first orientation information, the second orientation information, and the priority item that are acquired.

According to an aspect, motions for the robot are generated based on not only the information that specifies the first orientation and the second orientation, but also the at least one priority item regarding the movement from the first orientation to the second orientation, thus making it possible to provide the computer program that can generate appropriate motions that give consideration to the input priority item as well.

According to one or more aspects, it may be possible to provide a motion generation method, a motion generation device, a system, and a computer program that can generate optimum motions in accordance with the operation content or the like.

DETAILED DESCRIPTION

Figure 1:
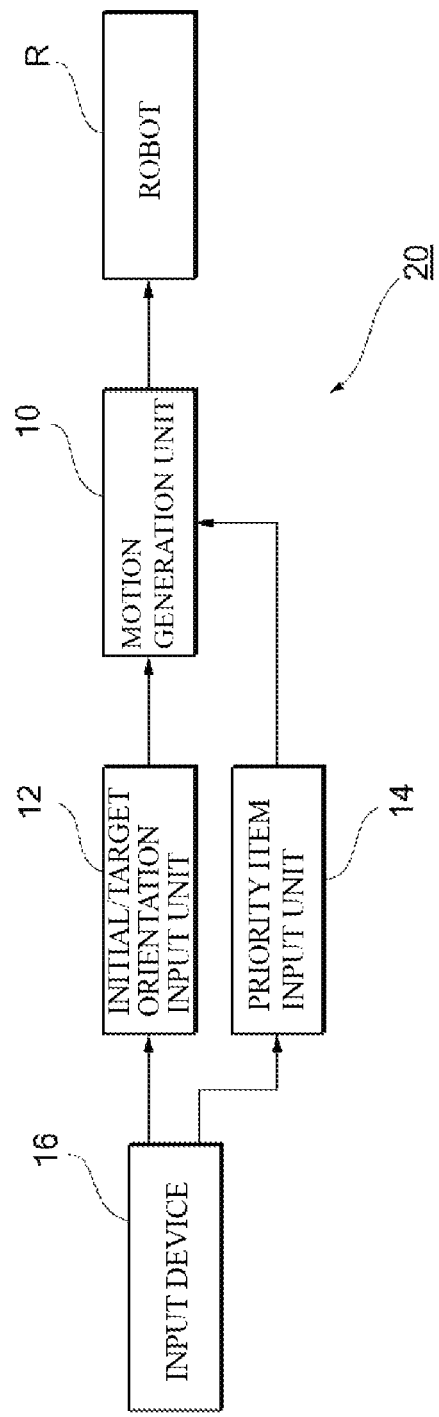
FIG. 1 is a function block diagram illustrating a motion generation system.

Embodiments will be described below with reference to the accompanying drawings (note that portions denoted by the same reference signs in the drawings have the same or similar configurations).

First Embodiment

FIG. 1 is a block diagram showing a motion generation system 20 according to a first embodiment, and this system includes a motion generation unit (motion generation device) 10, an initial/target orientation input unit 12, a priority item input unit 14, an input device 16, and a robot R.

Figure 2:
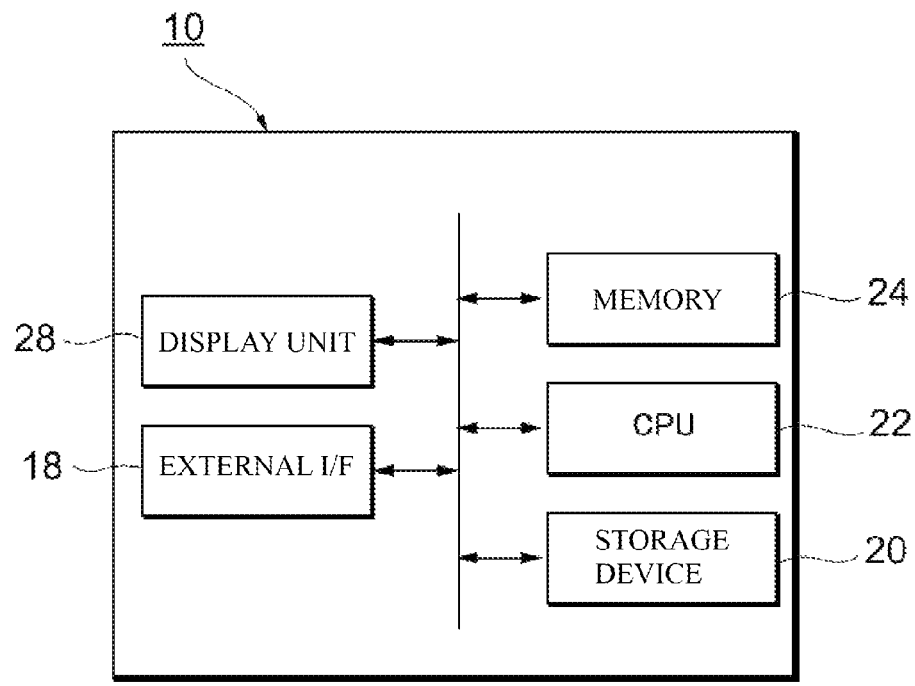
FIG. 2 is an internal configuration diagram illustrating a motion generation unit.

FIG. 2 shows the internal configuration of the motion generation unit 10. The motion generation unit 10 includes an external I/F 18 (acquisition unit) for exchanging information with an external device, a storage device 20 that stores a computer program for generating motions for the robot R, a CPU 22 for executing the computer program and executing calculation processing for generating motions, and a memory 24 for temporarily storing the computer program and data that is to be processed. The motion generation unit 10 further includes a display unit 28 for displaying data that has been input, processing results, and the like.

Note that the storage device 20 can be constituted by an HDD (Hard Disk Drive), an SSD (Solid State Drive), a NAND flash memory, a magnetic disk, an optical disk, or the like. The memory 24 can be constituted by a DRAM, an SRAM, or the like. Also, in addition to the CPU 22, the aforementioned calculation processing may be realized by any one or a combination of a DSP (Digital Signal Processor), a GPU (Graphics Processing Unit), an ASIC (Application Specific Integrated Circuit), an FPGA (Field Programmable Gate Array), and the like. In an embodiment, the motion generation unit 10 is constituted by a personal computer that has an integrated configuration, but the present invention is not limited to this. For example, the computer program for generation motions may be recorded in a server located on a network, and the processing thereof may be distributed among multiple computers. Also, the series of processes described in an embodiment is executed by the computer program stored in the storage device 20, but part of the functions of the computer program may be realized by hardware.

Figure 3:
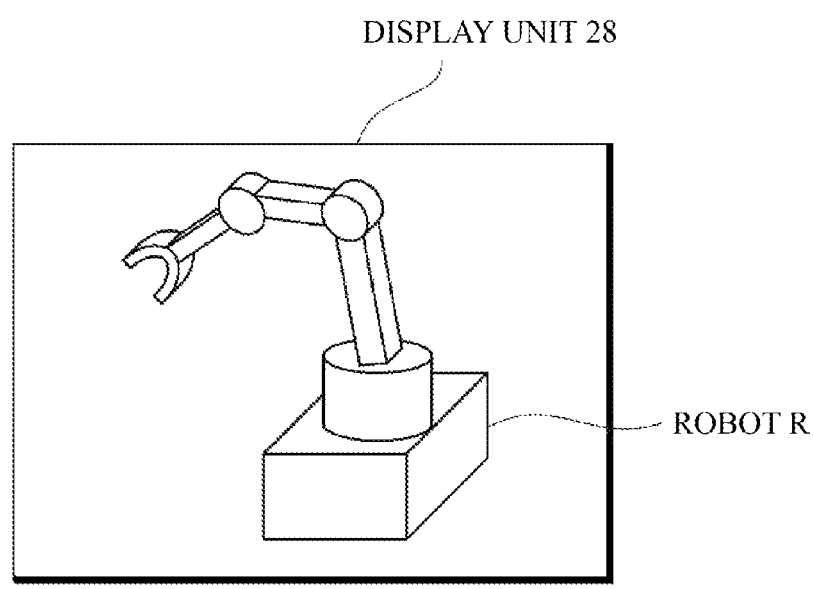
FIG. 3 is a diagram illustrating a robot displayed by a display unit.

The initial/target orientation input unit 12 is a unit for receiving an input of an initial orientation and a target orientation of the robot R. In an embodiment, as shown in FIG. 3, a user can view a GUI (Graphical User Interface) and use a mouse or keyboard, which is the input device 16, to change the orientation of the robot R displayed by the display unit 28. When the user sets a desired initial orientation and target orientation, the initial/target orientation input unit 12 uses the hardware configuration of the motion generation unit 10 (e.g., the storage device 20, CPU 22, and the memory 24) to calculate initial orientation information (first orientation information) and target orientation information (second orientation information) that are expressed by sets of angles of joints included in the robot R, and outputs the calculated information to the motion generation unit 10.

Note that the initial orientation and the target orientation are not required to be specified using the GUI. For example, the user can specify the initial orientation or the target orientation by using a keyboard, which is the input device 16, to directly input a set of angles of joints of the robot R (in this case, the orientation of the robot R may be displayed by the display unit 28 based on the input information). Alternatively, a configuration is possible in which information regarding the initial orientation or the target orientation is acquired by using kinematics information to calculate angles of joints of the robot R based on spatial coordinates (x, y, z, roll, pitch, yaw) of an extremity portion of the robot R, which have been specified by the user with use of the GUI or the like.

Figure 4:
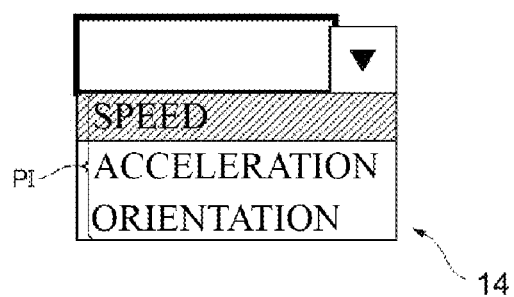
FIG. 4 is a diagram illustrating priority items displayed by a display unit.

FIG. 4 is shows priority items PI that are displayed on the display unit 28 by the priority item input unit 14. The user can use a mouse or a keyboard, which is the input device 16, to select one of the priority items PI that are displayed in a dropdown list. The priority item input unit 14 outputs the selected priority item PI to the motion generation unit 10.

Note that a configuration is possible in which the ID or name of a priority item is directly input with use of a keyboard, which is the input device 16, and output to the motion generation unit 10, and a configuration is possible in which a priority item is acquired by the motion generation unit 10 through reading a settings file, for example. For example, a configuration is possible in which, when the user uses the keyboard to input a keyword or phrase that indicates the item that is to be prioritized, the priority item input unit 14 selects the corresponding priority item PI and outputs it to the motion generation unit 10.

Here, the priority items PI refer to items that are to be prioritized with regard to robot operations, and in an embodiment, the speed, the acceleration, and the orientation of the robot R are indicated as the priority items. However, as long as the item is set with regard to operations of the robot that is the control target, there are no limitations on the items, and the items may include the movement distance of movement of the robot R from a predetermined initial orientation to a target orientation, and a moment of inertia (or torque) generated during movement. Furthermore, items such as a power saving mode and a safety mode are possible. It should be noted that information not related to robot operations themselves, such as information regarding a nearby obstacle, does not correspond to the items in an embodiment.

Figure 5:
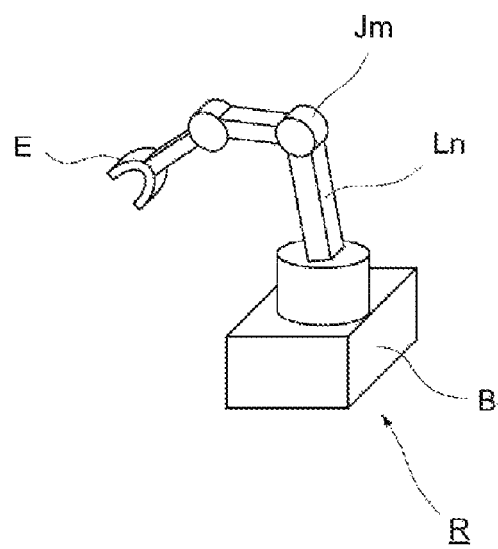
FIG. 5 is a schematic diagram illustrating a robot.

FIG. 5 shows the robot R that is the control target. As shown in this figure, the robot R is a robot arm that is a so-called articulated robot, and is constituted by a base B, an end effector E for gripping a workpiece, and an arm A that connects the base B to the end effector E. The base B is fixed to the floor in an embodiment, but may have a movable configuration. In the case of this configuration, the orientation also includes the spatial positions and directions that can be taken by the mechanism that enables movement, or input values (servo encoder values or the like) that are input to the movement mechanism in order to achieve such spatial positions and directions. The arm A is constituted by multiple link units $L_n$ (n being a natural number) and multiple joints $J_m$ (m being a natural number) that couple the link units to each other. The link units $L_n$ include motors (not shown) for driving the joints $J_m$, and are controlled based on control signals that are output from the motion generation unit 10 to the robot R. Also, the joints $J_m$ may each include an angle sensor AS (not shown) for detecting the rotation angle or the like, and output measured angle values or the like to the motion generation unit 10. The end effector E is attached to the leading end of the arm A, and is configured to be capable of gripping a workpiece W by opening and closing gripping tools. The end effector E may have a gripping mechanism for gripping by opening and closing multiple fingers, a mechanism for suction of the workpiece W, or a combination thereof, or may be able to hold the workpiece W without being provided with a special mechanism (e.g., a needle or plate-shaped jig). Also, the arm A may be provided with an image acquisition device such as a camera.

Note that the robot R is not limited to being a robot arm for gripping the workpiece W, and may be another robot such as an industrial robot. Also, instead of a robot that is actually used for work, the robot may be a virtual robot set in a simulator. A configuration is also possible in which, when using a simulator to perform trial/practice for determining motions, the motion generation device or method of an embodiment is applied in order to efficiently generate optimum motions.

Figure 6:
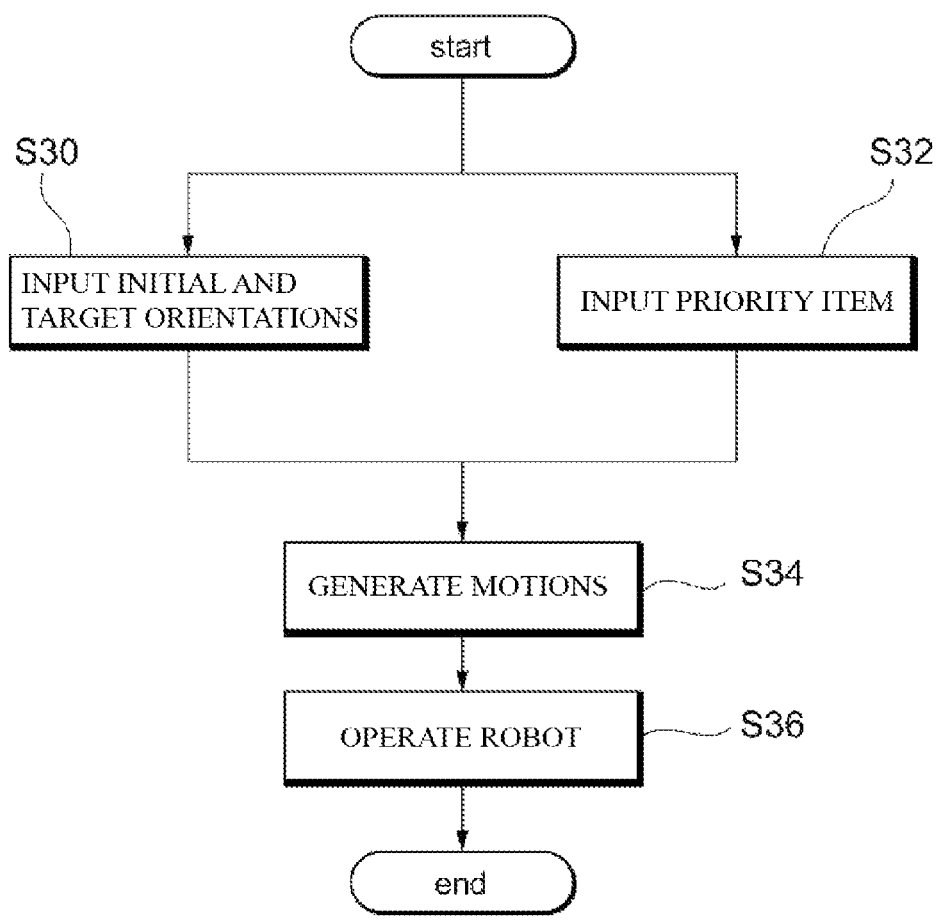
FIG. 6 is a flowchart illustrating motion generation processing in a first embodiment.

FIG. 6 is a flowchart showing motion generation processing of an embodiment.

First, an initial orientation and a target orientation are input by the user (step S30). Specifically, the user uses a mouse or the like to operate the robot displayed by the display unit 28 as a GUI, and determines an initial orientation and a target orientation for the robot R. The target orientation input unit 12 then calculates joint angle information that defines the initial orientation and the target orientation of the robot R, and outputs the calculated angle information to the motion generation unit 10. The external I/F 18 (acquisition unit) of the motion generation unit 10 acquires the information defining the initial orientation of the robot R and the information defining the target orientation of the same. This information is recorded in the memory 24, for example.

Next, a priority item PI is input by the user (step S32). Specifically, the user uses the mouse or the like to select an item that is to be prioritized in operation of the robot R from a pulldown menu displayed on the display unit 28 by the priority item input unit 14.

For example, in the case of a desire for the robot R to move to a predetermined position as fast as possible when not gripping the workpiece W, "speed" can be selected as the priority item PI.

On the other hand, in the case of movement for which accuracy is required, it is preferable to select "acceleration" as the priority item PI and generate motions according to which the acceleration is less than or equal to a predetermined value.

Also, there are cases where a large-mass workpiece W needs to be gripped, and if it is transported with a high acceleration, an excessive moment acts on the joints $J_m$ and the like of the robot R, and there is a possibility of damaging the joints $J_m$ and the like. In such a case, the user can select "acceleration" as the priority item PI and generate motions according to which the acceleration does not become excessive.

Also, in the case of gripping or transporting a "right side up" workpiece W or a workpiece W made up of components that are not fixed to each other, the user can select "orientation" as the priority item PI and generate motions according to which the orientation of the robot R is substantially constant during transport.

Note that multiple priority items PI may be selected at the same time. For example, in the case of generating motions for gripping and transporting a large-mass "right side up" workpiece W, the user may select "orientation" and "acceleration" as the priority items PI, and generate motions according to which a predetermined orientation is maintained, and also the acceleration is less than or equal to a predetermined value.

The priority item input unit 14 outputs information indicating the selected item to the motion generation unit 10. The external I/F 18 (acquisition unit) of the motion generation unit 10 acquires the information (item) that is to be prioritized in robot R motion generation. This information is recorded in the memory 24, for example.

Note that step S32 for acquiring the initial orientation and the target orientation and step S34 for acquiring the priority item PI do not need to be performed at the same time. For example, a configuration is possible in which the initial orientation is acquired, the priority item PI is acquired thereafter, and then lastly the target orientation is acquired.

Next, step S34 for motion generation is executed. Specifically, the CPU 22, which executes the computer program stored in the storage device 20, generates motions for the robot R for moving from the initial orientation to the target orientation based on data specifying the acquired initial orientation and target orientation and the selected priority item PI. These motions specify orientations, movement speeds, and movement paths for the robot R or a portion thereof (e.g., a predetermined link unit $L_n$ or the end effector E) to move from the initial orientation to the target orientation. Note that in an embodiment, motion generation is not limited to the generation of information specifying movement speeds, orientations, movement paths, and the like for the robot R, and also includes the case of generating control information for controlling the robot such that the orientations, speeds, and paths are consequently defined.

In an embodiment, algorithms are stored in advance in the storage device 20 as part of the computer program, namely a speed priority algorithm for movement from the initial orientation to the target orientation at the highest speed, an acceleration priority algorithm for movement from the initial orientation to the target orientation according to which the acceleration is less than or equal to a predetermined value, and an orientation priority algorithm for transporting the workpiece W to a target position while keeping the orientation of the workpiece W gripped by the end effector E constant compared to the orientation before being gripped, or keeping an amount of change in the orientation less than or equal to a predetermined value.

The motion generation unit 10 selects an optimum algorithm in accordance with the priority item PI acquired by the external I/F 18. Motions from the initial orientation to the target orientation, which were likewise acquired by the external I/F 18, are then generated in accordance with the selected algorithm (step S34).

The motion generation unit 10 outputs control signals for moving the robot R in accordance with the generated motions to the robot R, and the robot R thus moves from the initial orientation to the target orientation in accordance with these motions (step S36).

As described above, robot motion can be generated based on not only information that specifies the initial orientation and the target orientation, but also at least one item regarding movement for moving from the initial orientation to the target orientation, thus making it possible to generate appropriate motions that give consideration to the input item as well.

In particular, based on the idea that robot movement speed is not the only item for which priority is desired, focus was placed on the fact that depending on the transport target object, there are cases where the orientation of the transport target object during transport is the item for which priority is desired, and therefore it is possible to realize more appropriate motion generation. Focus was also placed on the fact that, depending on the transport target object, the moment that acts on various portions (particularly the joint portions) of the robot can become a problem, and acceleration is added as a priority item PI. Specifically, by generating motions such that, instead of transporting the transport target object with the arm A in a largely extended state, the transport target object may be transported with the arm A in a folded state so as to reduce the distance between the transport target object and the base B, thus making it possible to reduce the maximum value of the moment that acts on the robot during transport.

Also, in an embodiment, multiple algorithms for motion generation are stored in the storage device 20 in association with the corresponding items that are to be prioritized, and the algorithm associated with the selected priority item PI is selected and used to generate motions, but the present invention is not limited to this. For example, a configuration is possible in which there is a single algorithm that has the initial orientation, the target orientation, and multiple priority items PI as arguments, and different motions (having at least different robot orientations, movement speeds, or movement paths that change from the initial orientation to the target orientation) are generated in accordance with the selected item.

In particular, a configuration is possible in which the user or the like is allowed to select multiple items that have been given weights (priorities), and optimum motions are generated in accordance with the acquired item information and the priorities of the items. For example, in the case where the priorities 30% and 70% can be set for "speed" and "orientation" respectively, the motion generation device can generate motions for moving the workpiece W at a higher speed while also permitting somewhat of a change in the orientation of the gripping target workpiece W in comparison with motions in the case where only "orientation" was selected. As another example, in the case where only "orientation" is selected as the priority item (priority 100%) and the workpiece W is transported, but it is then determined that somewhat of a change in the orientation of the workpiece W during transport does not have a large influence, more appropriate motion generation can be performed by lowering the priority of "orientation" and selecting "speed" as another priority item. In order to realize such a configuration, it is possible to use a motion generation algorithm that has multiple priority items and priorities thereof as arguments, and that can generate different motions according to the priorities even if the priority items are the same. Accordingly, it is possible to perform even more appropriate motion generation, and thus expect a rapid improvement in work efficiency.

Also, the initial orientation and the target orientation are not required to be the orientations at the beginning and the end of the series of movements, and may be orientations during movements. For example, a configuration is possible in which, when the robot repeatedly carries out a predetermined routine operation, in the first portion of the routine operation, motions are generated for movement from the initial orientation at the start of the routine to an intermediate orientation serving as the target orientation with speed as the priority item, then in an intermediate portion, motions are generated for movement from the intermediate orientation serving as the initial orientation to another intermediate orientation serving as the target orientation with orientation as the priority item, and then in a later portion, motions are generated for movement from the other intermediate orientation serving as the initial orientation to the first initial orientation serving as the target orientation with speed as the priority item again. In this way, in a series of routine operations, motions in one portion and motions in another portion can be generated based on different priority items (e.g., using different algorithms).

Furthermore, various modifications can be made to the hardware configuration of an embodiment. For example, the motion generation device can be configured as a calculation device that internally includes the motion generation unit 10 and has the initial/target orientation input unit 12 and the priority item input unit 14 as input ports. Also, a configuration is possible in which the external I/F 18 acquires primary information for calculating the initial orientation or the target orientation, and the motion generation unit 10 acquires orientation information that specifies the initial orientation or the target orientation based on the primary information.

Also, in the case where the user is proficient with algorithms, a configuration is possible in which the item to be prioritized is specified with use of an algorithm name or input parameter instead of a name that expresses that item.

For example, with the STOMP (Stochastic Trajectory Optimization for Motion Planning) algorithm, the extremity orientation and torque of the robot can be constrained with the expressions shown below. It should be noted that appropriate cost functions (qc, qt) need to be set, and this eliminates the effect that efficient motion generation can be performed even by a user who is not familiar with the robot.

$$q(\theta) = \sum_{t=0}^{T} q_o(\theta_t) + q_c(\theta_t) + q_t(\theta_t)$$ Expression 1

$$q_o(\theta_t) = \sum_{b \in B} \max(\varepsilon + \gamma_b - d(x_b), 0) \|\dot{x}_b\|,$$

$$q_c(\theta_t) = \sum_{c \in C} |v_c(\theta_t)|,$$

$$q_t(\theta_t) = \sum_{t=0}^{T} |\tau_t| dt$$

$$T_t = f(X_t, \dot{X}_t, \ddot{X}_t),$$

Second Embodiment

Figure 7:
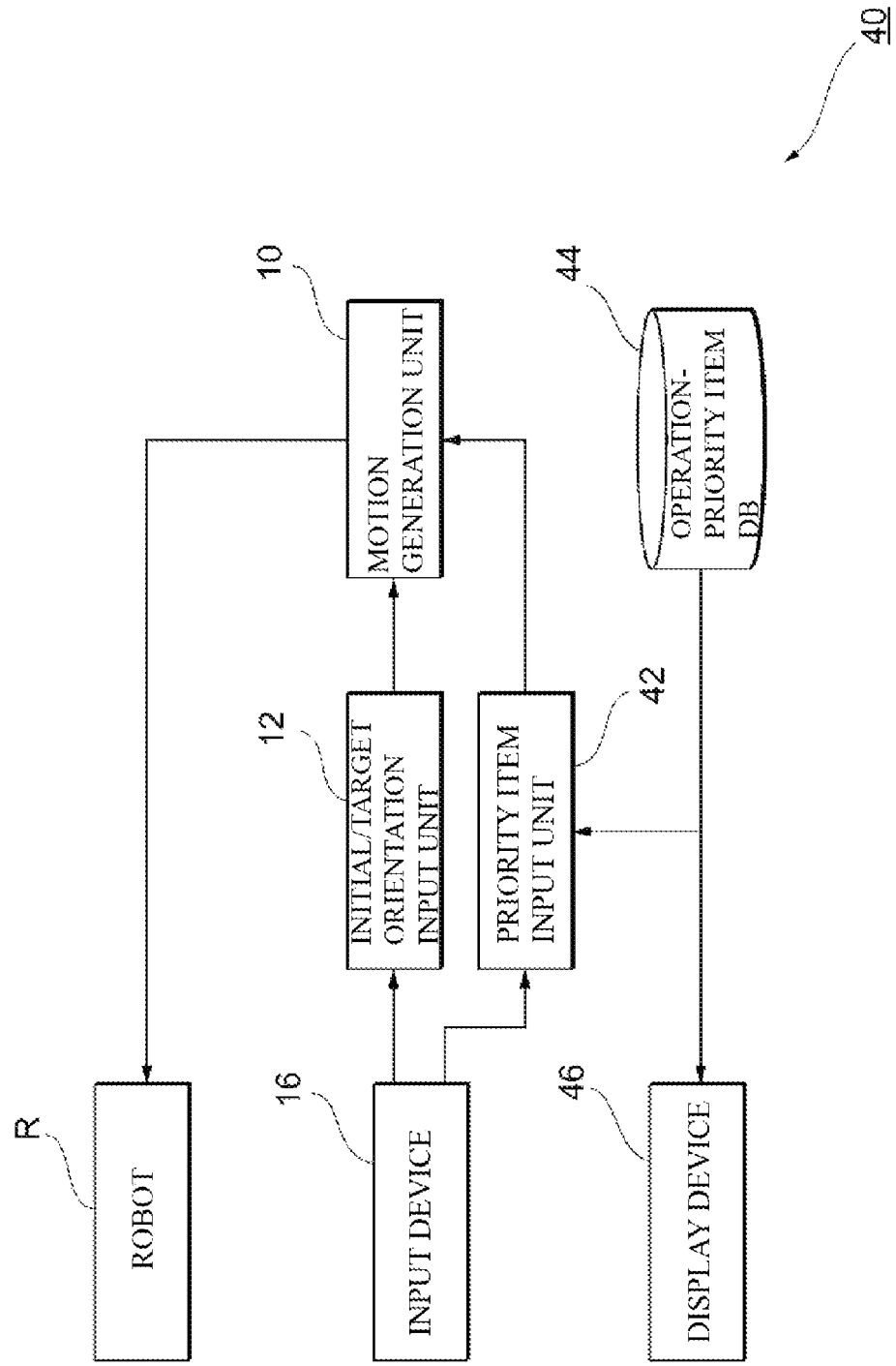
FIG. 7 is a function block diagram illustrating a motion generation system.

FIG. 7 is a function block diagram showing a motion generation system 40 according to a second embodiment. This motion generation system 40 includes the motion generation unit (motion generation device) 10, the initial/target orientation input unit 12, the input device 16, a priority item input unit 42, an operation-priority item DB 44, and a display device 46. In the following, descriptions are not given for matters that are the same as in a first embodiment, and only differences will be described.

The motion generation system 40 of an embodiment is different from the motion generation system 20 of a first embodiment with respect to including the operation-priority item DB 44, which is a database in which types of operation content are associated with priority items PI. This DB 44 may be provided in a computer that is different from the motion generation unit 10, or may be provided in the storage device 20 of the motion generation unit 10.

Also, the display device 46 displays the types of operation content that can be performed by the robot R, and the priority items PI that are associated with the types of operation content. The types of operation content that are displayed include, for example, "gripping operation without rotation of extremity" and "simple movement without gripping workpiece", and "orientation" and "speed" are respectively displayed as the associated priority items PI for the former and the latter. The priority items PI are displayed along with weights, depending on the type of operation content.

The operation-priority item DB 44 is a database that stores the association between types of operation content and priority items PI.

With use of the hardware configuration of the motion generation unit 10 (e.g., the storage device 20, the CPU 22, and the memory 24), the priority item input unit 42 accesses the operation-priority item DB 44 and causes the display device 46 to display combinations of types of operation content and the priority items PI associated therewith. The priority item PI that is selected by the user with use of the input device 16 is then acquired and output to the motion generation unit 10.

Figure 8:
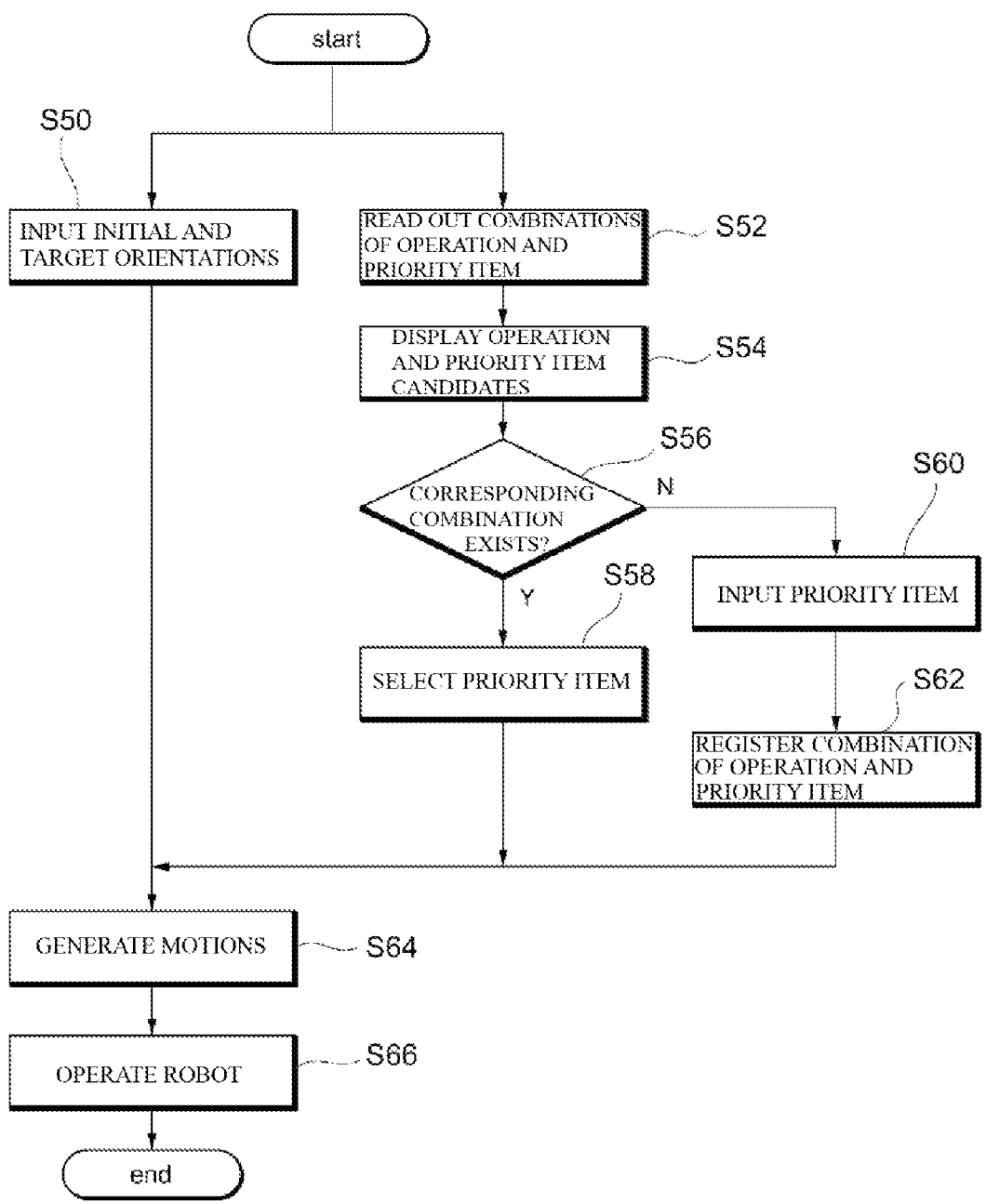
FIG. 8 is a flowchart illustrating motion generation processing in a second embodiment.

FIG. 8 is a flowchart showing motion generation processing according to a second embodiment.

The input of the initial and target orientations (step S50) is the same as in a first embodiment and will not be described here.

At the same time as the input of the initial and target orientations is accepted from the user, the priority item input unit 42 accesses the operation-priority item DB 44 and reads out combinations of types of operation content and the priority items PI associated therewith (step S52), and causes the display device 46 to display the read-out combinations of operations and the priority items PI associated therewith as selection candidates (step S54).

The user determines whether or not there is an appropriate combination of a desired type of operation content and corresponding item PI that is to be prioritized (step S56). If an appropriate combination exists, that priority item PI is selected using the input device 16 (step S58).

On the other hand, if an appropriate priority item PI is not registered for the desired type of operation content, the user can input a priority item PI using the input device 16 (step S60), and register that combination of a type of operation content and a priority item PI in the DB 44 (step S62).

The motion generation unit 10 then generates motions based on the priority item PI, the initial orientation, and the target orientation that were acquired (step S64), and the robot R operates in accordance with the generated motions (step S66), and these aspects are the similar to a first embodiment.

In an embodiment, types of operation content and priority items PI are associated with each other, and therefore the user can easily select an appropriate priority item.

Also, a combination of a type of operation content and a corresponding item PI that is to be prioritized can be registered at a later time, thus making it possible to select priority items PI that correspond to various types of operation content. Also, content registered by the user in the past can be reused, and a more appropriate priority item PI can be set with reference that such registered content. Note that similarly to a first embodiment, one type of operation content may be associated with multiple items PI, and a weight can be given to each item.

Note that although the user selects an appropriate combination from among candidate combinations of a type of operation content and a priority item PI in an embodiment, alternatively, a configuration is possible in which the priority item input unit 42 proposes an appropriate combination of a type of operation content and a priority item PI from among multiple candidates. Depending on the proficiency of the user, the user may not be able to appropriately select an item that is to be prioritized for a type of operation content, and therefore with the above configuration, it is possible to provide a motion generation method that is even more user-friendly.

Also, although types of operation content and priority items are associated with each other in an embodiment, a configuration is possible in which priority items are associated with operation targets instead of types of operation content. For example, (1) "liquid" or "unwelded or unsoldered part" and (2) "solid" or "welded or soldered part" are set as the operation targets, and "orientation" and "speed" are stored as the priority items PI respectively associated with the former and the latter in the operation-priority item DB 44. The user determines whether or not there is an appropriate combination of a desired operation target and a corresponding item PI that is to be prioritized, and if an appropriate combination exists, the user can select that priority item PI using the input device 16.

According to this configuration, it is possible to select an appropriate priority item in accordance with the operation target. Note that combinations of a type of operation content and an operation target may be stored in association with priority items.

Third Embodiment

Figure 9:
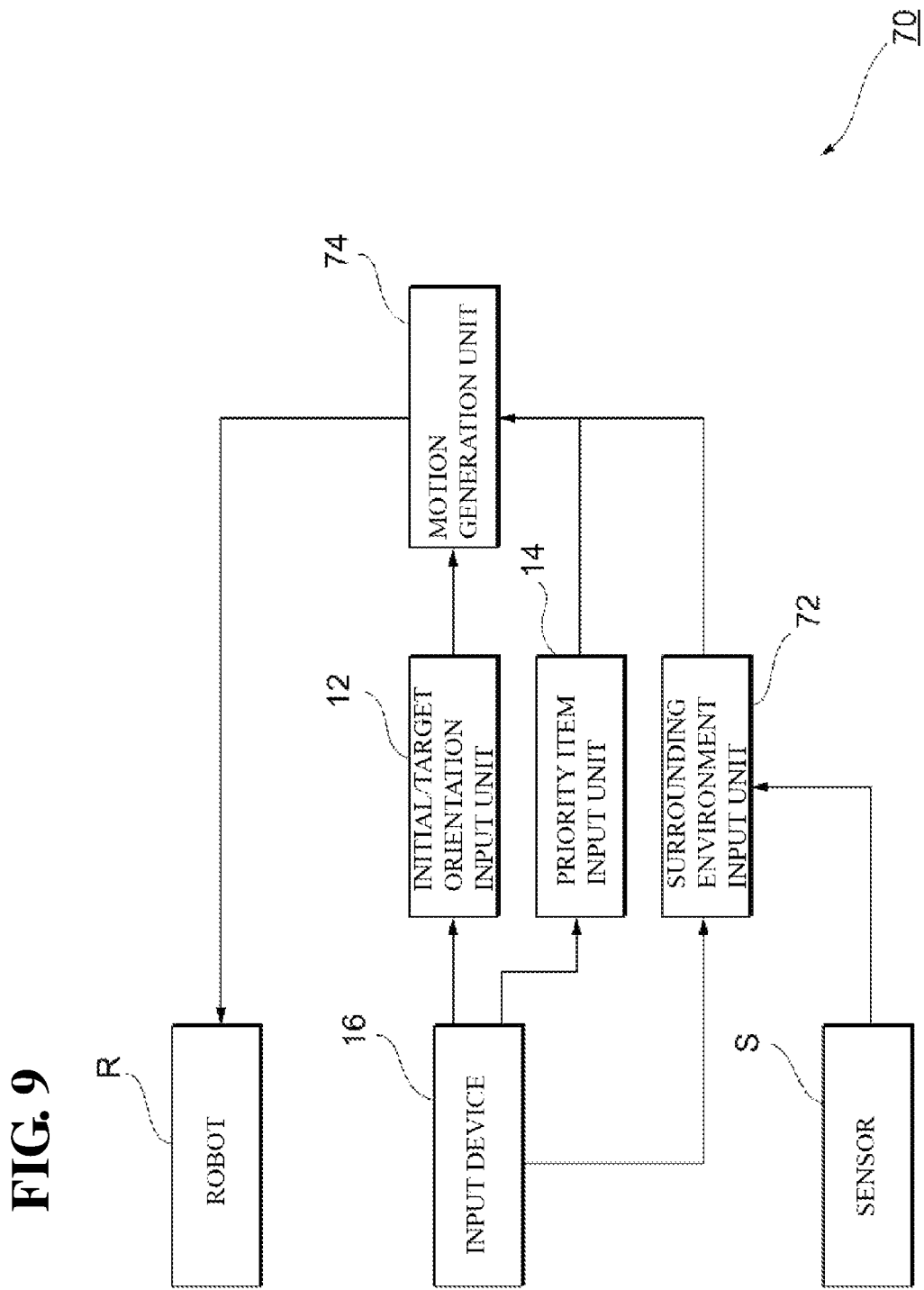
FIG. 9 is a function block diagram illustrating a motion generation system.

FIG. 9 shows a motion generation system 70 according to a third embodiment.

This motion generation system 70 includes the initial/target orientation input 12, the priority item input unit 14, the input device 16, and the robot R, as well as a sensor S, a surrounding environment input unit 72, and a motion generation unit 74. Note that in the following, descriptions are not given for matters that are the same as in first and second embodiments, and only differences will be described.

The motion generation unit 74 includes the external I/F 18 (acquisition unit) for exchanging information with an external device, the storage device 20 that stores a computer program for generating motions for the robot R, the CPU 22 for executing the computer program and executing calculation processing for generating motions, the memory 24 for temporarily storing the computer program and data that is to be processed, and the display unit 28 for displaying data that has been input, processing results, and the like. The motion generation unit 74 generates motions for the robot R based on initial and target orientations, a priority item, and a surrounding environment that have been input via the external I/F 18.

The surrounding environment input unit uses the hardware configuration of the motion generation unit 74 (e.g., the storage device 20, the CPU 22, the memory 24, and the display unit 28) to allow the user to input obstacle information.

Figure 10:
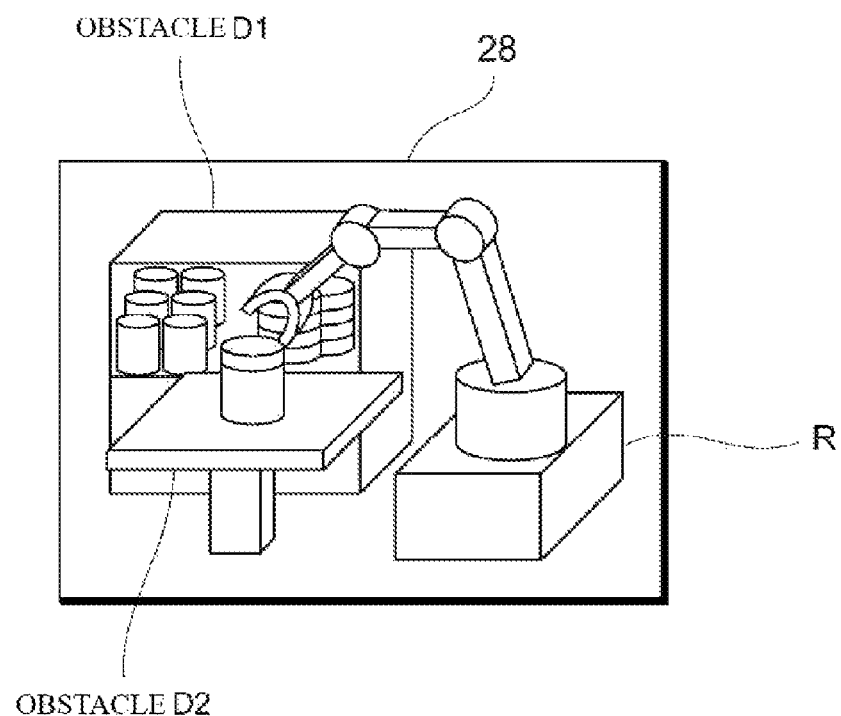
FIG. 10 is a diagram illustrating a robot and nearby obstacles displayed as a GUI.

First, as shown in FIG. 10, the surrounding environment input unit 72 causes the display unit 28 to display a GUI. The user can use the input device 16 to set an obstacle in the displayed GUI. Accordingly, it is possible to generate and simulate efficient motions that presume an obstacle. Note that instead of or in addition to user input, obstacle information can also be set by reading a settings file.

Furthermore, in an embodiment, a configuration is possible in which an image acquisition camera is used as the sensor S, an image of the surroundings of the robot R is acquired, and image information obtained by performing measurement can be acquired by the surrounding environment input unit 72 as part of the obstacle information. Based on the obstacle information set by the user and the surrounding image information acquired from the sensor S, the surrounding environment input unit 72 outputs, to the motion generation unit 74, geometric parameters including the shapes, positions, and orientations of obstacles in the surroundings of the robot.

Then, based on the initial orientation information and the target orientation information acquired from the initial/target orientation input unit 12, the priority item acquired from the priority item input unit 14, and the surrounding environment information acquired from the surrounding environment input unit 72, the motion generation unit 74 generates motions for the robot R so as to avoid the obstacles.

Figure 11:
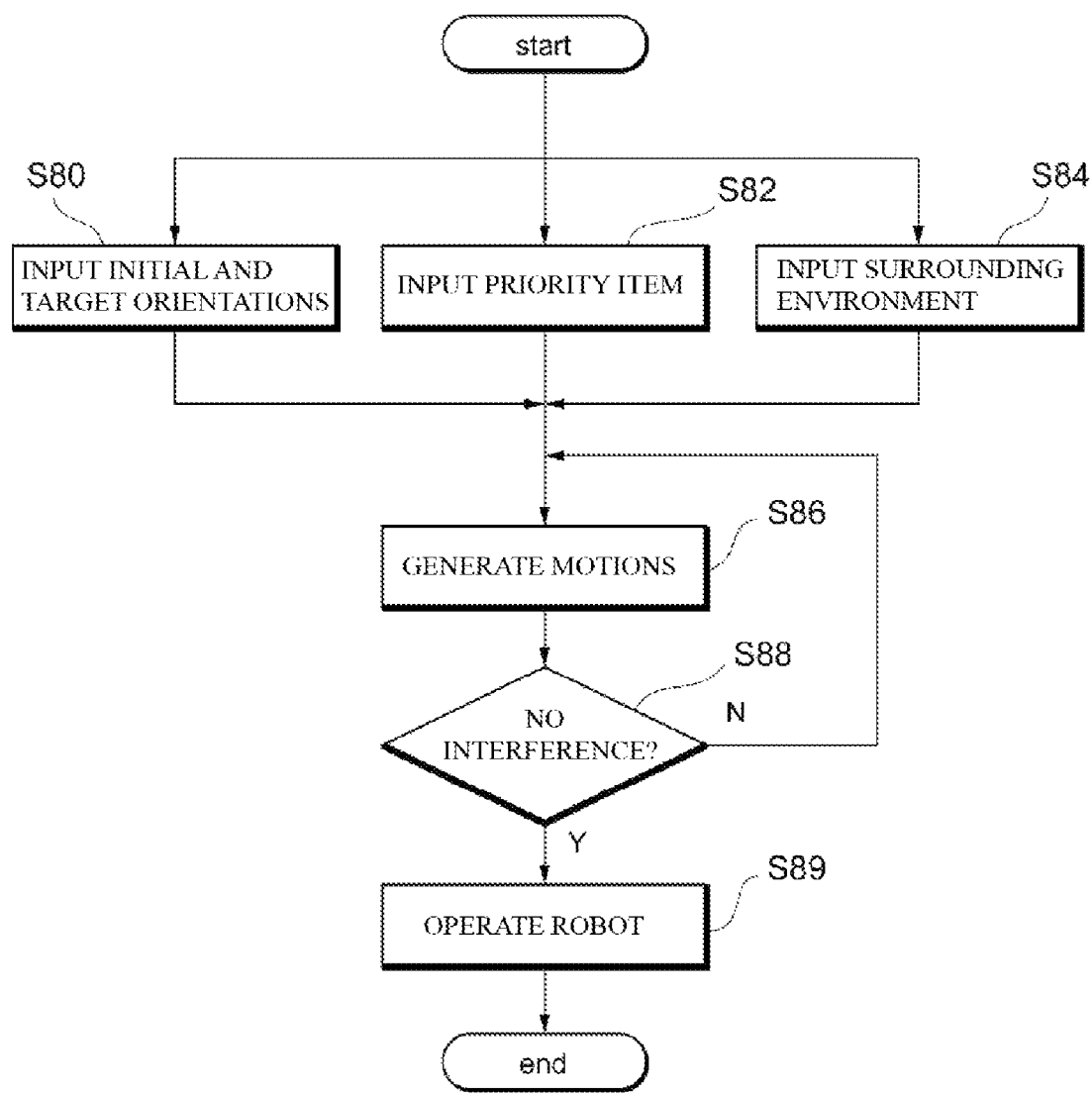
FIG. 11 is a flowchart illustrating motion generation processing in a third embodiment.

FIG. 11 is a flowchart of motion generation processing performed in the motion generation system 70 described above.

The input of the initial orientation and the target orientation (step S80) and the input of the priority item (step S82) are the same as in other embodiments, and therefore will not be described here.

Next, in step S84, the surrounding environment input unit 72 acquires surrounding environment information via the GUI or from the sensor S, calculates geometric parameters including the shapes and positions (and orientations) of obstacles (e.g., an obstacle D1 and an obstacle D2 shown in FIG. 10) that exist in the surrounds of the robot, and outputs the geometric parameters to the motion generation unit 74.

In step S86, the motion generation unit 74 generates motions for the robot R based on the initial orientation information, the target orientation information, and the priority item that were acquired, similarly to other embodiments. Then the motions and the geometric parameters of the obstacle are compared, and it is determined whether the obstacles and the motions will interfere with each other (step S88). For example, it is possible to determine whether or not interference will occur by comparing the position coordinates of polyhedrons that encompass intermediate orientations of the robot R during the motions with the position coordinates of polyhedrons that encompass the obstacles. If interference will occur, new motions are generated (step S86), and it is again determined whether or not the obstacles and the generated motions will interfere with each other (step S88). The above steps S86 and S88 are repeated until interference will not occur. Note that instead of this trial and error method, the method for generating motions that avoid the obstacles may be a method of determining interference with an obstacle at each intermediate point in the motions, a method of prioritizing the selection of a location at a distance from an obstacle, or the like.

If it is determined that the generated motions and the obstacles will not interfere with each other, the robot R is caused to operate in accordance with the motions (step S89).

As described above, in an embodiment, motions for the robot R to move from the initial orientation to the target orientation are generated based on the initial orientation information, the target orientation information, the surrounding obstacle information, and the priority item. Accordingly, it is possible to efficiently generate motions that can be applied to more practical operations.

Also, the surrounding environment information is not limited to being measurement data acquired by the sensor S for image acquisition, and may be acquired from another sensor (e.g., a laser range finder or a LIDAR), or acquired from CAD data regarding the surrounding environment.

Fourth Embodiment

Figure 12:
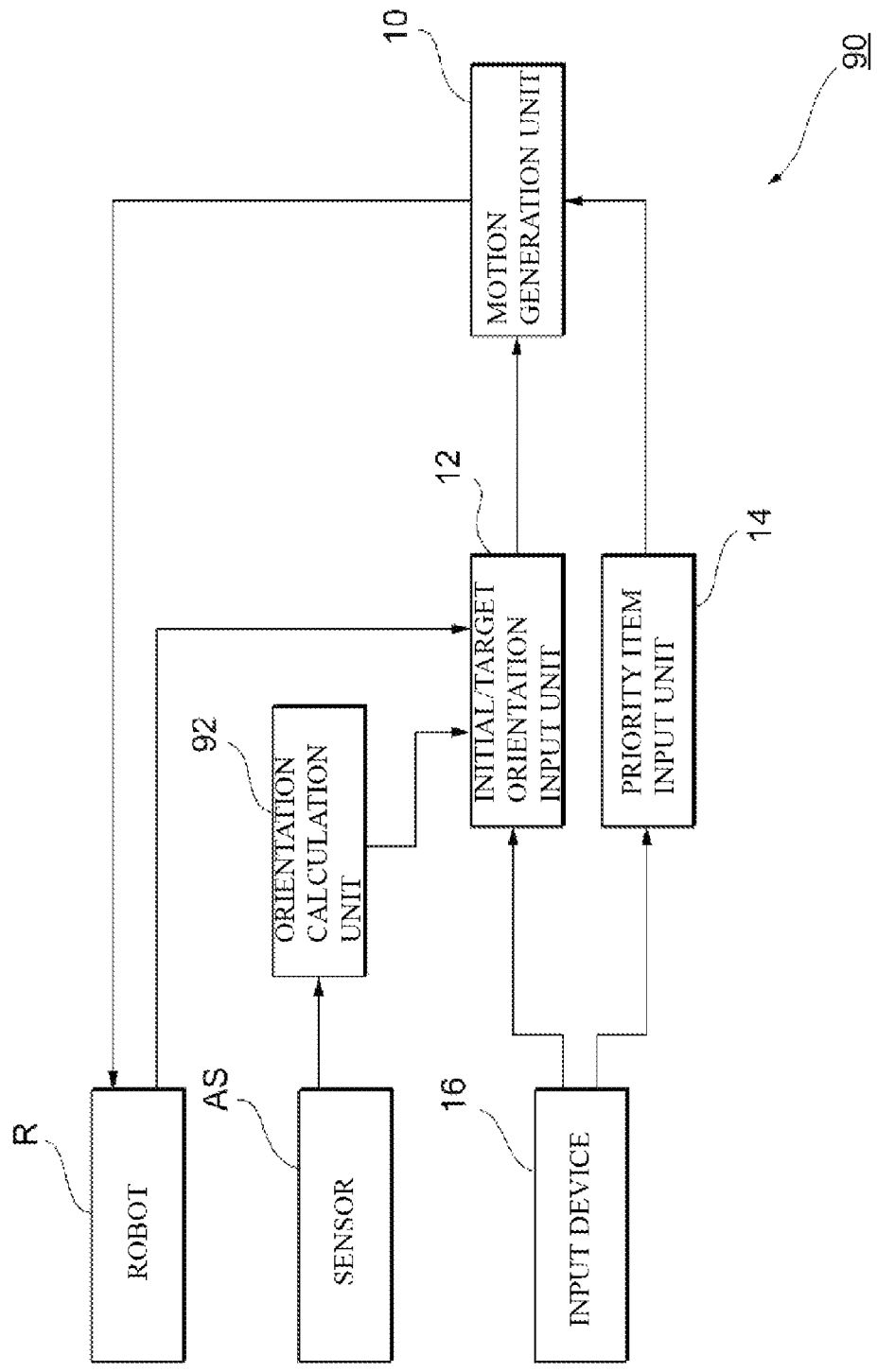
FIG. 12 is a function block diagram illustrating a motion generation system.
Figure 13:
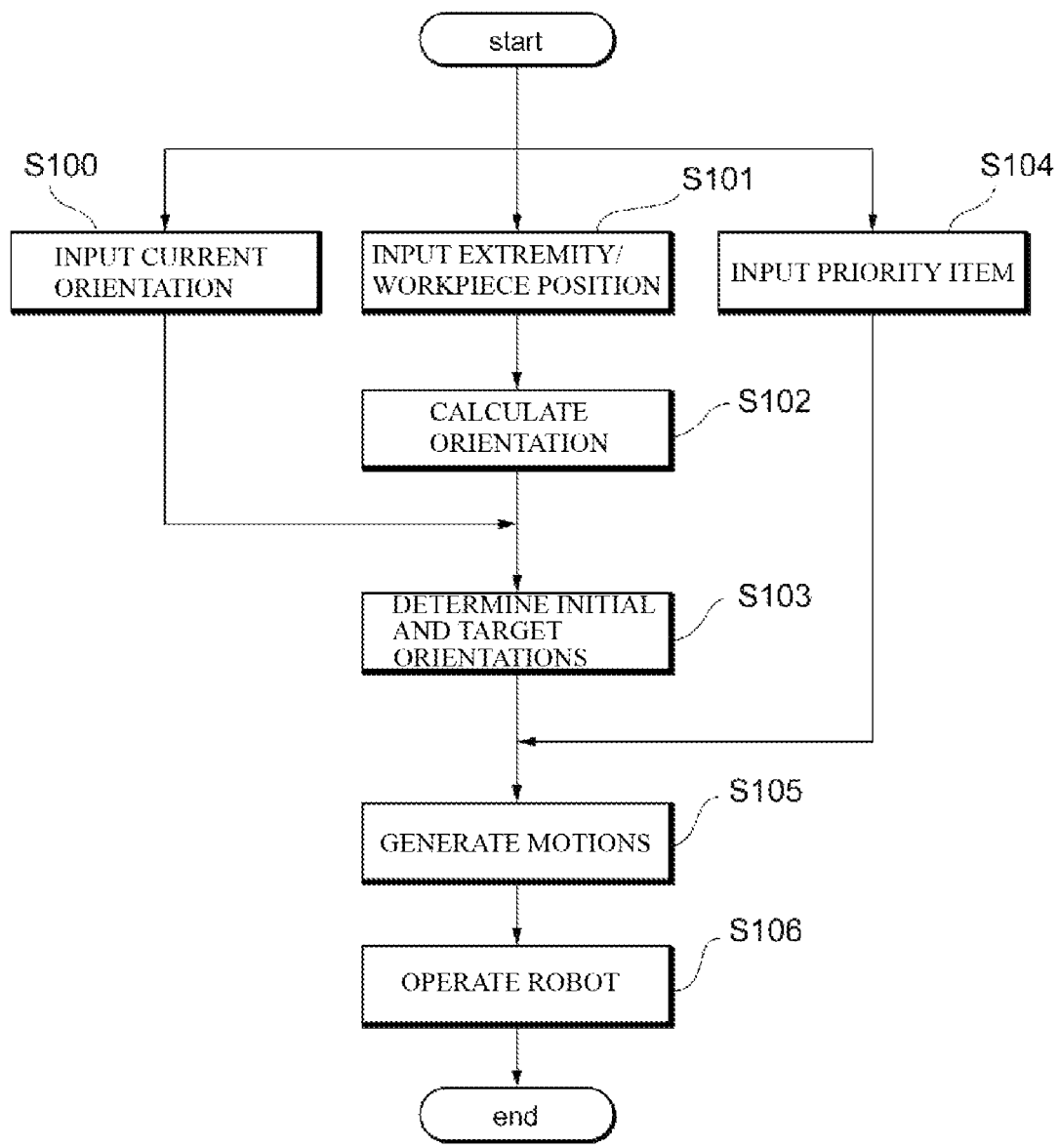
FIG. 13 is a flowchart illustrating motion generation processing in a fourth embodiment.

FIG. 12 is a function block diagram of a motion generation device 90 according to a fourth embodiment. This motion generation device 90 includes angle sensors AS, the motion generation unit 10, the initial/target orientation input unit 12, the priority item input unit 14, the input device 16, and the robot R, and unlike other embodiments, also includes an orientation calculation unit 92. FIG. 13 is a flowchart showing motion generation processing performed with use of the motion generation device 90.

The orientation calculation unit 92 of an embodiment includes a computer program that is stored in the storage device 20 and is for orientation calculation, and can acquire orientation information regarding the current orientation of the robot R with use of the hardware configuration of the motion generation unit 10 (e.g., the storage device 20, the CPU 22, and the memory 24). Accordingly, as shown in step S100, the current orientation of the robot R can be acquired as the initial orientation or the target orientation with use of the orientation calculation unit 92. Specifically, the rotation angles of the joints $J_m$ of the robot R are measured using the angle sensors AS provided in the respective joints $J_m$, the orientation calculation unit 92 acquires angle signals as the measurement results, and, based on the angle signals, calculates position information and orientation information that specifies the orientation of the robot R, and the initial orientation information or the target orientation information is acquired in this way (step S103).

Also, the initial orientation or the target orientation information can be calculated by the orientation calculation unit 92 based on orientation information regarding the extremity portion (the end effector E) of the robot R, which is input by the user with use of the input device 16 or the GUI (step S101).

Figure 14:
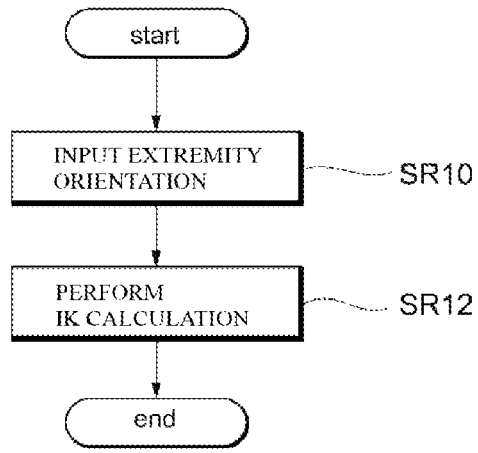
FIG. 14 is a flowchart illustrating processing for calculating an orientation based on an extremity orientation.

Specifically, a subroutine such as that shown in FIG. 14 is executed. First, the orientation of the extremity of the robot R is set as the initial orientation or the target orientation by the user (step SR10). The orientation calculation unit 92 then carries out IK (Inverse Kinematics) calculation (step SR12). Here, IK calculation is a calculation method that uses position and orientation information regarding the leading end of an articulated robot to perform simple inverse calculation of angles and positions of joints for realizing that position. As a result of this orientation calculation processing (step S102), the initial orientation or target orientation information is determined and acquired (step S103).

Furthermore, orientation information can also be obtained based on spatial position information regarding the workpiece W that is to be gripped (step S101). For example, in the case of gripping a workpiece W that is not placed at a predetermined position, but rather is placed on and moving on a conveyor such as a belt conveyor, in the case of picking workpieces W that are arranged irregularly, or in the case where the initial orientation or the target orientation changes from time to time, it is desirable that the initial orientation or the target orientation is determined based on the position of the workpiece W.

Figure 15:
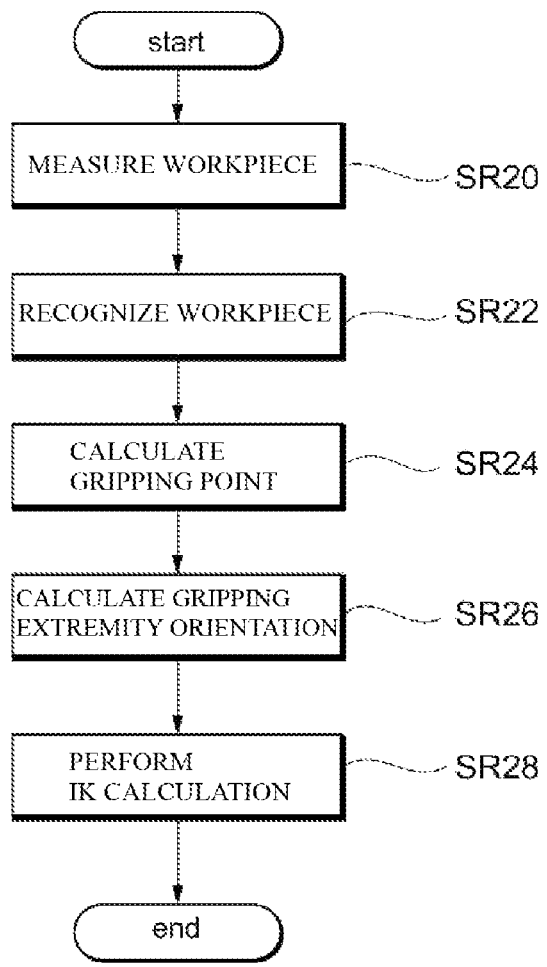
FIG. 15 is a flowchart illustrating processing for calculating an orientation based on a workpiece position.

FIG. 15 shows a subroutine for determining the initial orientation or the target orientation of the robot R based on the spatial position of the workpiece W. First, the workpiece W is imaged and measured using an image sensor S that is provided in the robot R or an image sensor S that is provided above the belt conveyor or on a ceiling portion (step SR20). The orientation calculation unit 92 then processes the image acquired from the sensor S, and recognizes (acquires) the workpiece W (step SR22). If the shape, color, and the like of the workpiece W are known in advance, the workpiece W can be recognized using known technology.

Next, the orientation calculation unit 92 calculates a gripping point or a gripping position of the workpiece W (step SR24). For example, contact conditions corresponding to the end effector E are stored in advance in the storage device 20 for various model shapes, such as a circular column, a sphere, or a cuboid, and a gripping point of the workpiece W can be specified by calculating a contact point based on the shape of the workpiece W that is actually recognized by the image sensor S. An orientation of the extremity portion for gripping the workpiece W at the calculated gripping point is then calculated (step SR26). Thereafter, the above-described IK calculation is executed, and overall orientation information for the robot R is calculated (step SR28). As a result of this procedure, the initial orientation information or the target orientation information is calculated and acquired by the motion generation unit 10 (step S103).

In addition to the above-described steps, a priority item is acquired (step S104) and input to the motion generation unit 10 similarly to the descriptions given in other embodiments.

The motion generation unit 10 generates motions based on the initial and target orientation information and the priority item that were acquired (step S105), and the robot R is controlled based on the generated motions.

By employing this configuration, the current orientation of the robot R at a certain time can be acquired as the initial orientation or the target orientation, and it is possible to reduce the need for the user to perform troublesome input operations.

Also, it is possible to acquire the initial orientation or the target orientation of the robot R based on the position of the workpiece W or the orientation of the extremity of the robot R, and it is possible to reduce the need for the user to perform troublesome input operations.

Part or all of the above embodiments can be described as shown below, but the present invention is not intended to be limited to the following descriptions.

Note 1

A motion generation method for generating a movement for changing a robot from a first orientation to a second orientation, the motion generation method including;

acquiring first orientation information that specifies the first orientation and second orientation information that specifies the second orientation;

acquiring at least one priority item regarding the movement for changing from the first orientation to the second orientation; and generating a motion of the robot that includes a movement path along which the robot moves from the first orientation to the second orientation, based on the first orientation information, the second orientation information, and the priority item that are acquired.

Note 2

A motion generation device for generating a movement for changing a robot from a first orientation to a second orientation, the motion generation device including:

a first acquisition unit configured to acquire first orientation information that specifies the first orientation and second orientation information that specifies the second orientation;

a second acquisition unit configured to acquire at least one priority item regarding the movement for changing from the first orientation to the second orientation; and a movement generation unit configured to generate a motion of the robot that includes a movement path along which the robot moves from the first orientation to the second orientation, based on the first orientation information, the second orientation information, and the priority item that are acquired.

Note 3

A computer program for generating a movement for changing a robot from a first orientation to a second orientation, the computer program causing a computer to execute:

acquiring first orientation information that specifies the first orientation and second orientation information that specifies the second orientation;

acquiring at least one priority item regarding the movement for changing from the first orientation to the second orientation; and generating a motion of the robot that includes a movement path along which the robot moves from the first orientation to the second orientation, based on the first orientation information, the second orientation information, and the priority item that are acquired.

The embodiments described above are for facilitating understanding of the present invention, and are not for interpreting the present invention in a limiting manner. The constituent elements of the embodiments, as well as the arrangements, materials, conditions, shapes, sizes, and the like thereof are of course not limited to the illustrated examples, and can be changed as appropriate. Also, configurations shown in different embodiments can be partially substituted or combined.

The invention claimed is:

1. A motion generation method for generating a movement for changing a robot from a first orientation to a second orientation, the motion generation method comprising:
    acquiring first orientation information that specifies the first orientation and second orientation information that specifies the second orientation;
    acquiring a plurality of priority items regarding the movement for changing from the first orientation to the second orientation, the plurality of priority items comprising a speed of the robot and an acceleration of the robot;
    selecting one of the plurality of priority items;
    generating a motion of the robot comprising a movement path along which the robot moves from the first orientation to the second orientation according to the selected priority item such that the selected priority item is prioritized over others of the plurality of priority items; and
    controlling the robot so as to cause the robot to operate according to the generated motion.

2. The motion generation method according to claim 1, further comprising:
    selecting a type of operation content or an operation target of the robot; and
    determining the priority item to be selected based on the type of operation content or the operation target that is selected.

3. The motion generation method according to claim 2, further comprising:
    associating the type of operation content or the operation target with the selected priority item.

4. The motion generation method according to claim 1, further comprising:
    selecting a plurality of the plurality of priority items;
    assigning different priorities to the selected plurality of the plurality of priority items; and
    generating the motion based on the assigned priorities of the plurality of selected priority items.

5. The motion generation method according to claim 1, further comprising:
    acquiring surrounding environment information regarding the robot; and
    generating the motion based on the acquired surrounding environment information.

6. The motion generation method according to claim 5, wherein the surrounding environment information is acquired: using a sensor that acquires information regarding surroundings of the robot; using an input unit; or from electronic data that includes information regarding surroundings of the robot.

7. The motion generation method according to claim 1, wherein the first orientation information is acquired based on an orientation of the robot.

8. The motion generation method according to claim 1,
    wherein the robot comprises a robot arm that includes an extremity portion, and
    the first orientation information or the second orientation information is acquired based on a position and an orientation of the extremity portion.

9. The motion generation method according to claim 8, wherein
    the generated motion comprises a movement for handling a workpiece, and
    the second orientation information is acquired based on spatial position information regarding the workpiece.

10. The motion generation method according to claim 1, wherein the robot comprises a simulator device for virtually testing a movement.

11. The motion generation method according to claim 1, wherein the plurality of priority items comprises a constraint condition regarding the movement.

12. The motion generation method according to claim 1, wherein the plurality of priority items further comprises at least one of: an orientation of a first target object that is to be handled by the robot; a movement distance of the robot; and a moment of inertia of the robot.

13. The motion generation method according to claim 12,
    wherein the motion generation further comprises selecting, based on the selected priority item, any one of: a first algorithm that generates the motion such that a movement time of the robot when moving from the first orientation to the second orientation is in a predetermined range; a second algorithm that generates the motion such that an acceleration of the robot when moving from the first orientation to the second orientation is in a predetermined range; and a third algorithm that generates the motion such that an orientation of a second target object that is to be handled by the robot when moving from the first orientation to the second orientation is in a predetermined range.

14. A non-transitory computer-readable storage medium storing a computer program for generating a movement for changing a robot from a first orientation to a second orientation, the computer program causing a computer to perform operations comprising:
    acquiring first orientation information that specifies the first orientation and second orientation information that specifies the second orientation, the plurality of priority items comprising a speed of the robot and an acceleration of the robot;
    acquiring a plurality of priority items regarding the movement for changing from the first orientation to the second orientation;
    selecting one of the plurality of priority items;
    generating a motion of the robot comprising a movement path along which the robot moves from the first orientation to the second orientation according to the selected priority item such that the selected priority item is prioritized over others of the plurality of priority items; and
    controlling the robot so as to cause the robot to operate according to the generated motion.

15. A motion generation device for generating a movement for changing a robot from a first orientation to a second orientation, the motion generation device comprising a processor configured with a program to perform operations comprising:
    operation as a first acquisition unit configured to acquire first orientation information that specifies the first orientation and second orientation information that specifies the second orientation, the plurality of priority items comprising a speed of the robot and an acceleration of the robot;

operation as a second acquisition unit configured to acquire a plurality of priority items regarding the movement for changing from the first orientation to the second orientation, and to select one of the plurality of priority items;

operation as a movement generation unit configured to generate a motion of the robot comprising a movement path along which the robot moves from the first orientation to the second orientation according to the selected priority item such that the selected priority item is prioritized over others of the plurality of priority items; and controlling the robot so as to cause the robot to operate according to the generated motion.

16. The motion generation device according to claim 15, wherein the processor is configured with the program to perform operations further comprising:

operation as a selection unit configured to select of a type of operation content or an operation target of the robot; and operation as a priority item determination unit configured to determine the priority item to be selected based on the type of operation content or the operation target that is selected.

17. The motion generation device according to claim 16, wherein the processor is configured with the program to perform operations further comprising:

operation as a registration unit configured to associate the type of operation content or the operation target with the selected priority item.

18. The motion generation device according to claim 15, wherein the processor is configured with the program such that:

operation as the second acquisition unit comprises acquiring a plurality of the selected priority items and assigning different priorities to the plurality of selected priority items, and operation as the movement generation unit comprises generating the motion based on the priorities of the plurality of selected priority items.

19. A system comprising the robot and the motion generation device according to claim 15 for generating a movement for changing the robot from a first orientation to a second orientation.

* * * * *